UNITED STATES PATENT OFFICE.

AARON C. HORN, OF NEW YORK, N. Y.

HARDENING CEMENTITIOUS MATERIALS.

1,114,140. Specification of Letters Patent. Patented Oct. 20, 1914.

No Drawing. Application filed October 9, 1912. Serial No. 724,742.

*To all whom it may concern:*

Be it known that I, AARON C. HORN, a citizen of the United States, and a resident of New York, in the county of New York and State of New York, have invented certain new and useful Improvements in Hardening Cementitious Materials, of which the following is a specification.

This invention relates to a method of hardening and solidifying cementitious material more generally of the nature of Portland cement and concrete, and to the product of said process, namely a hardened structural mass preferably colored certain characteristic colors or shades; and in some forms becoming a duplex or multiplex cementitious structure by the cementing together of two or more layers or strata of different compositions and relative hardness; all as more fully hereinafter described and as claimed.

The surface of ordinary concrete, even when laid with the greatest precautions, nearly always exhibits the undesirable propriety of dusting on slight attrition. This is unimportant, in the case of walls and vertical structures, generally speaking, but is of serious consequence in the case of floors, sidewalks and the like where attrition quickly causes deterioration. Many attempts have been made to harden the surface of concrete which has to be subjected to such attrition, but no cheap and easily applied material of a thoroughly effective nature has been heretofore proposed. Silicate of soda has been tried as a surface wash, but does not have the desired hardening qualities, especially as applied to a floated surface of fine grain and but slightly porous. The use of the fluosilicates also has been recommended, and these are probably of considerable utility except for the rather high cost of the materials. Powdered metals, especially iron has been used but has certain disadvantages among which is the tendency to gradually discolor the concrete by progressive changes on protracted exposure.

By my invention cheap and easily obtainable materials may be used which also enable the concrete to be suitably colored in certain shades without the addition of inert coloring material such as ordinary oxid of iron, lampblack and the other customary pigments used for coloring cement, but which if anything have an undesirable action or effect on the strength. Under my invention, is afforded the opportunity to obtain certain permanent colors in concrete without impairing the strength and in fact with increase of the hardness of the resulting surface.

My invention involves the use in cement or concrete of a quantity of a valency-changing material of a potentially-bonding character, more specifically, an oxid capable of change of valence under the conditions imposed in concrete structural work.

The ordinary oxids of iron of the $Fe_2O_3$ type are incapable of further change of valency and cannot be used to good advantage in the present process except as fillers or inert material, in which case there is no gain in such use, and often a detrimental action. On the other hand, oxids of the $Fe_3O_4$ type have certain very desirable properties in concrete mixtures under conditions as will be hereinafter set forth, and may be used to harden concrete while at the same time affording to the mass a desirable shade of color. Thus while oxids of the hematite type usually tend to decrease the hardness of a concrete surface, the oxids of the magnetite type are effective in hardening such surfaces in an unexpected way, yielding apparently a new product, namely a concrete with particles of magnetite or its products of reaction actually bonded and combined therewith.

In order to secure magnetite material reactive to the most serviceable degree I prefer to calcine the raw ore at a low temperature, relatively speaking, and to then grind to a fine powder. Preferably also I quench the heated magnetite in water after calcination in order to render it more easily ground and improve its reactivity. Preferably the magnetite material should be reduced to the fineness of Portland cement or thereabout to secure the best results. The ordinary magnetite affords a black or nearly black colored concrete and some of the calcined material gives a maroon color which is very pleasing in appearance. In mixing the active magnetite thus obtained or as derived in any other suitable manner, I preferably mix the dry materials to thoroughly incorporate and then add water to make a plastic mass. This is then formed into shape and allowed to set. The active magnetite may also be mixed with the dry cement and subsequently incorporated with the aggregate, if used. Water-proofing materials may be added as required, preferably using, however, ammonium stearate material and the like. The addition of a small amount of calcium chlorid in the water used for gaging the concrete is desirable. Barium chlorid may be mixed with the magnetite in various proportions to adjust the set more or less, and accelerate the reaction to some extent under certain circumstances. It should here be stated that although the magnetite material is sufficiently active if properly prepared, to not require such accelerating material, yet if over calcined or otherwise improperly treated it may require greater or less amounts of accelerating material of the nature of barium chlorid.

When mixed in accordance with the foregoing, only 10% of the magnetite material is sufficient to harden the cement remarkably, and also to afford a desirable shade or shades of color. Ten per cent. of ordinary iron oxid coloring material would weaken the cement but this amount of the magnetite material, instead of weakening the cement and increasing the dusting as would perhaps be expected, has quite the contrary and unexpected action of hardening the product to greatly reduce or eliminate dusting.

A special surface of great hardness may be made by mixing equal parts of Portland cement and magnetite active material rendering plastic with water and troweling on a concrete surface or foundation to yield a dustless or practically dustless finishing coat. Another formula suitable in this connection is made by mixing 43 parts of Portland cement, 30 parts finely ground magnetite material, 24 parts of coarsely ground or crushed magnetite, and 3 parts of finely ground ferrous sulfate. Reactive black oxid of manganese may also be added if desired. The ferrous sulfate is in itself a hardening material to some extent but the amount which may be used is perhaps usually regulated by the effect on the setting time of the cement. The foregoing proportions may be varied more or less according to the structure which is to be treated and its use.

I believe the peculiar action of the active magnetite material to be due to its capacity to change in valency when in contact with the wet concrete materials, thereby producing a bond between the iron and lime or other materials present causing the hardening observed. As to the precise nature of this reaction I am however unable to advance any details but content myself with calling attention to the observed changes.

In the foregoing formulas I have mentioned illustratively several bodies of equivalent character, etc., which may be used under the present invention, but it is to be noted that by such illustrative disclosure I no not limit myself to the exact formulas or combinations mentioned, but may use other materials, giving like results or functionally similar and hence may invoke the doctrine of equivalency in so far as same may be thus applicable. For example, ferrous sulfate or a mixture of a ferrous and a ferric salt may be used in lieu of the magnetite with suitable proportioning of the components of the concrete mixture. Manganese salts may similarly be used in some cases.

A further feature of my invention is that which involves the use of carbid of iron or similar carbid material in Portland or other hydraulic cement. Carbid of iron, $Fe_3C$, is a product not obtainable in native conditions so far as I am advised, but can be derived commercially from high carbon steel. This compound may be added in proportion varying from about 2% to 15% or so, to cement mortar and such additions enable the production of a surface of great density, but essentially or substantially free from any increased abrasive qualities due to the presence of the carbid. In other words, the carbid of iron lends hardness to the cement concrete without increasing its undesirable erosive qualities.

The combination of carbid of iron with magnetite serves to provide a composition of especially good hardening properties more particularly when a considerable proportion of sand is employed in the concrete. A mixture of equal parts of magnetite and iron carbid serves for ordinary purposes and these proportions may be varied more or less preferably using say one part of magnetite to three parts of iron carbid in case the cement mortar contains any material quantities of clayey bodies present by accident or design; and on the other hand increasing the proportion of magnetite to three parts or so to one part of carbid in the case of mortars containing sand of moderate sharpness in considerable quantities.

What I claim is:—

1. The process of making a hardened concrete which comprises incorporating with cement materials a quantity of active magnetite, ferrous sulfate and black oxid of manganese, in working up to a plastic mass with water and in forming into any desired shape.

2. A new cementitious material comprising Portland cement and a mixture of magnetite, ferrous sulfate and black oxid of manganese.

3. A new cementitious material comprising hydraulic cement and a mixture of magnetite, ferrous sulfate and black oxid of manganese.

4. A new cementitious material comprising hydraulic cement and a mixture of comminuted magnetite, ferrous sulfate and black oxid of manganese.

Signed at New York city in the county of New York and State of New York this 30 day of September A. D. 1912.

AARON C. HORN.

Witnesses:
 EDWARD D. NEWMAN,
 CARLETON ELLIS.

Copies of this patent may be obtained for five cents each, by addressing the "Commissioner of Patents, Washington, D. C."